(12) United States Patent
Olson et al.

(10) Patent No.: US 10,223,444 B2
(45) Date of Patent: *Mar. 5, 2019

(54) PROTOCOL BASED USER DATA MANAGEMENT

(71) Applicant: INTERNATIONAL BUSINESS MACHINES CORPORATION, Armonk, NY (US)

(72) Inventors: John T. Olson, Tucson, AZ (US); Erik Rueger, Ockenheim (DE); Christof Schmitt, Tucson, AZ (US); Michael L. Taylor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/992,554

(22) Filed: May 30, 2018

(65) Prior Publication Data

US 2018/0285451 A1   Oct. 4, 2018

Related U.S. Application Data

(63) Continuation of application No. 15/472,377, filed on Mar. 29, 2017.

(51) Int. Cl.
   *G06F 17/30*      (2006.01)
   *H04L 29/06*      (2006.01)
   (Continued)

(52) U.S. Cl.
   CPC ........ *G06F 17/30702* (2013.01); *G06F 17/30* (2013.01); *H04L 41/0893* (2013.01);
   (Continued)

(58) Field of Classification Search
   CPC ......... G06F 17/30029; G06F 17/30035; G06F 17/30345; G06F 17/30174; H04W 12/08;
   (Continued)

(56) References Cited

U.S. PATENT DOCUMENTS 7,266,595 B1   9/2007   Black et al.
7,689,524 B2   3/2010   Ozzie et al.
(Continued)

FOREIGN PATENT DOCUMENTS

EP   2194477 A1   6/2010
WO   0031664 A3   6/2000
WO   WO 00/31664   *   6/2000

OTHER PUBLICATIONS

IBM: List of IBM Patents or Patent Applications Treated as Related (Appendix P), May 30, 2018, pp. 1-2.
(Continued)

*Primary Examiner* — Srirama Channavajjala
(74) *Attorney, Agent, or Firm* — Anthony M. Pallone

(57) ABSTRACT

An embodiment of the invention may include a method, computer program product, and system for data management. The embodiment may include receiving a login token and instruction from a user device. The login token is associated with a user of the user device. The instruction may be reading or writing profile data belonging to the user. The embodiment may include determining whether a user profile container exists for the user based on the received login token. The embodiment may include creating the user profile container for the user based on determining that the user profile container does not exist. Creating the user profile container for the user may include identifying profile data belonging to the user located in a plurality of locations within a file system and storing identified profile data belonging to the user within a single binary large object. The embodiment may include executing the received instruction.

1 Claim, 5 Drawing Sheets

(51) Int. Cl.
*H04L 12/24* (2006.01)
*H04W 12/08* (2009.01)
*H04L 29/08* (2006.01)

(52) U.S. Cl.
CPC ........ *H04L 63/083* (2013.01); *H04L 63/0846* (2013.01); *H04L 63/101* (2013.01); *H04L 63/102* (2013.01); *H04L 67/306* (2013.01); *H04W 12/08* (2013.01)

(58) Field of Classification Search
CPC ............. H04L 41/0893; H04L 63/0846; H04L 63/101–63/102; H04L 67/306; H04L 67/22
See application file for complete search history.

(56) References Cited

U.S. PATENT DOCUMENTS

| | | | |
|---|---|---|---|
| 7,792,934 | B2 | 9/2010 | Klein |
| 8,443,068 | B2 | 5/2013 | Lee et al. |
| 8,904,503 | B2 | 12/2014 | Agbabian |
| 9,996,610 | B1* | 6/2018 | Olson ................ H04L 63/102 |
| 2005/0108297 | A1* | 5/2005 | Rollin ............... G06F 17/30174 |
| 2011/0314401 | A1* | 12/2011 | Salisbury .............. H04N 5/232 715/771 |
| 2012/0011551 | A1 | 1/2012 | Levy et al. |
| 2012/0054280 | A1* | 3/2012 | Shah .................... G06F 9/5072 709/205 |
| 2012/0290702 | A1* | 11/2012 | Vincent .............. G06F 9/45558 709/223 |
| 2014/0122623 | A1* | 5/2014 | Nerieri ................ H04L 67/306 709/206 |
| 2014/0201824 | A1* | 7/2014 | Agbabian ........... G06F 21/6245 726/6 |
| 2014/0337406 | A1* | 11/2014 | Bortolamiol .......... H04L 67/306 709/203 |
| 2014/0344922 | A1* | 11/2014 | Lam ...................... G06F 21/629 726/19 |
| 2015/0133164 | A1* | 5/2015 | Song ...................... G06Q 10/10 455/456.3 |
| 2015/0150148 | A1 | 5/2015 | Warner |
| 2015/0205622 | A1* | 7/2015 | DiVincent .............. G06F 21/32 713/100 |
| 2017/0116556 | A1* | 4/2017 | Brower, Jr. ........ G06F 17/30861 |
| 2018/0285452 | A1* | 10/2018 | Olson .................. H04L 63/102 |

OTHER PUBLICATIONS

Olson et al., U.S. Appl. No. 15/992,571, filed May 30, 2018, entitled "Protocol Based User Data Management", 24 Pages.
Sutterer et al., "User Profile Management on Service Platforms for Ubiquitous Computing Environments", IST project, Copyright 2007, pp. 287-291, IEEE, Germany.
Wikipedia, "Application Layer", https://en.wikipedia.org/wiki/Application_Layer, Printed on Mar. 1, 2017, pp. 1-3.
Wikipedia, "Roaming User Profile", https://en.wikipedia.org/wiki/Roaming_user_profile, Printed on Jan. 16, 2017, pp. 1-7.
Mell et al., "The NIST Definition of Cloud Computing", NIST, Sep. 2011, pp. 1-3, Special Publication 800-145, U.S. Department of Commerce, Gaithersburg, MD.
Olson et al., Pending U.S. Appl. No. 15/472,377, filed Mar. 29, 2017, titled "Protocol Based User Data Management," pp. 1-26.
Olson et al., Pending U.S. Appl. No. 15/704,248, filed Sep. 14, 2017, titled "Protocol Based User Data Management," pp. 1-23.

* cited by examiner

PROTOCOL BASED USER DATA MANAGEMENT

BACKGROUND

The present invention relates to computer user profiles, and more specifically, to the management of user profile data.

A user profile is a collection of settings that make the computer look and function in accordance with user defined preferences. A user's profile may contain settings for desktop backgrounds, screen savers, pointer preferences, sound settings, and other features. Profiles ensure that user specific personal preferences are used whenever a user logs into a computer.

BRIEF SUMMARY

An embodiment of the invention may include a method, computer program product, and system for data management. The embodiment may include receiving a login token and instruction from a user device. The login token is associated with a user of the user device. The instruction may be reading profile data belonging to the user or writing profile data belonging to the user. The embodiment may include determining whether a user profile container exists for the user based on the received login token. The embodiment may include creating the user profile container for the user based on determining that the user profile container does not exist. Creating the user profile container for the user may include identifying profile data belonging to the user located in a plurality of locations within a file system. Creating the user profile container for the user may include storing identified profile data belonging to the user within a single binary large object. The embodiment may include executing the received instruction.

DETAILED DESCRIPTION

Embodiments of the present invention will now be described in detail with reference to the accompanying Figures.

User profile data provides a user an individual experience when working with a computer (e.g. MS Windows PC or Linux PC). A profile may exist for each user defined on a computer or for each user defined in a user directory. Where the user directory is shared among many computers by means of network enabled storage, such as network attached storage (NAS), and accessed via file sharing protocols, such as SMB or NFS, a user profile is global in the sense that it can be accessed from any network enabled computer and provide a user with a seamless individual experience across multiple computers. A typical user profile (i.e. for MS Windows) is made up of hundreds of small files, where each file defines one or more aspects of user specified computer settings, such as screen background, author name for new text documents, sound settings, and more. It is common for profile files to be spread across multiple directories. Furthermore, in NAS environments, it is common to have a very large number of users utilizing the same file storage infrastructure. In such an environment, the file storage system must manage a massive amount of user profile data. This in turn may negatively impact overall file performance as the file storage system needs to keep track of profile data changes per user, and per profile file, and ensure protection of user profile files (e.g. backups).

In an effort to alleviate the problems associated with numerous user profiles located in non-contiguous and disparate portions of a file system, profile data management system 100, described below, performs a method for user profile data management. During initial retrieval of profile information, profile data management system 100 consolidates the entirety of a user's profile into a single user profile container holding the hundreds of small files that make up a user's profile. Profile data management system 100 implements one profile container per user and implements a profile manager to control access and maintenance of user profile containers. Through the use of user profile containers, duplicate individual user profile data will be prevented. Furthermore, the proposed solution will improve overall profile file performance and manageability as the container holding a user's profile data only needs to be accessed once, rather than accessing hundreds of user profile files stored across multiple directories in NAS.

Figure 1:
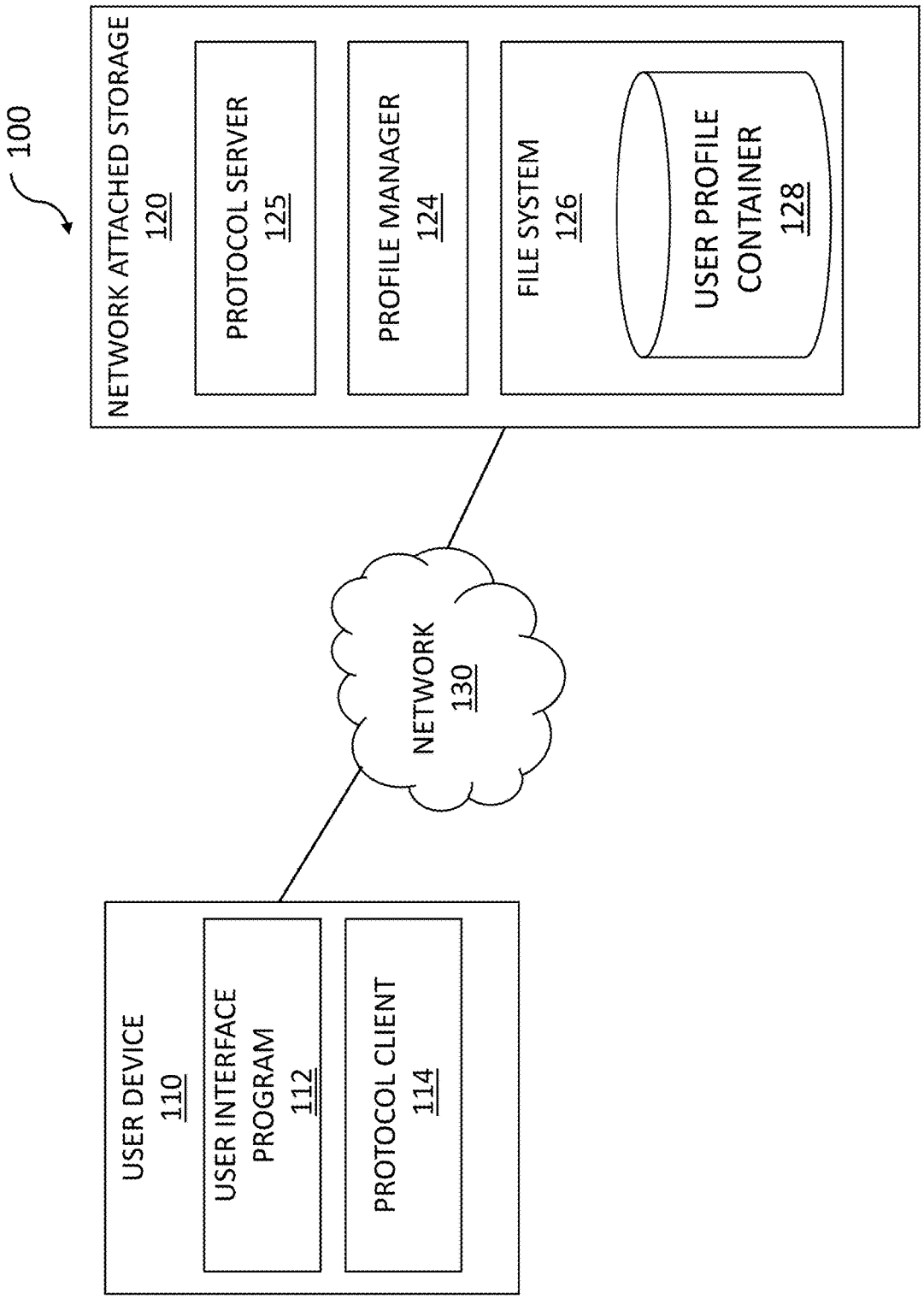
FIG. 1 is a functional block diagram illustrating a profile data management system, in accordance with an embodiment of the present invention.

FIG. 1 is a functional block diagram illustrating profile data management system 100, in accordance with an embodiment of the present invention. Profile data management system 100 may be a distributed communication environment, including user device 110 and network attached storage 120 interconnected via network 130.

Network 130 may be implemented as, for example, a local area network (LAN), a wide area network (WAN) such as the Internet, or a combination of the two. Network 130 may include, for example, wired, wireless or fiber optic connections. In general, network 130 may be any combination of connections and protocols that will support communications between user device 110 and network attached storage 120, in accordance with an embodiment of the invention.

User device 110 may include a user interface program 112 and protocol client 114. User device 110 may be a desktop computer, a notebook, a laptop computer, a tablet computer, a handheld device, a smartphone, a thin client, or any other electronic device or computing system capable of sending and receiving data to and from other computing devices such as network attached storage 120 via network 130. In an example embodiment, user device 110 may send data (e.g. user profile data) to network attached storage 120, via protocol client 114. Furthermore, in an example embodiment user device 110 may also receive data (e.g. user profile data) from network attached storage 120, via protocol client 114. User device 110 is described in more detail with reference to FIG. 3.

User interface program 112 may be a program, or subroutine contained in a program, that may allow a user to log-on or log-off user device 110, and access global user profile data. User interface program 112 may include components used to receive data from a user and transmit the data, via protocol client 114, to an application residing on network attached storage 120. In an example embodiment, upon logging-on, user interface program 112 may receive input, such as a login token, from a user and transmit that login token, via protocol client 114, to protocol server 125, located on network attached storage 120, thus allowing user device 110 to read, via profile manager 124, from the user's user profile container 128 stored within file system 126. The login token may include user specific information such as username and password. In an example embodiment, upon logging-off, user interface program 112 may again transmit the login token, via protocol client 114, to protocol server 125 so that user device 110 may write, via profile manager 124, to the user's user profile container 128 stored within file system 126.

Protocol client 114 may be a program, or subroutine contained in a program, that may facilitate user access to data stored within file system 126. Protocol client 114 may specify the shared protocols and interface methods (e.g. SMB, NFS) used by computing devices to communicate data requests across a computer network. In an example embodiment, protocol client 114 may receive a login token from user interface program 112 and transmit the received login token, across network 130, to protocol server 125, located on network attached storage 120. In an example embodiment, protocol client 114 may transmit and receive user profile data, across network 130, to and from protocol server 125. Protocol client 114 may also send and receive data (e.g. user profile data) to and from user device 110.

Network attached storage 120 may include a profile manager 124, a protocol server 125, and a file system 126. Network attached storage 120 may be a desktop computer, a notebook, a laptop computer, a networked computer appliance, or any other networked electronic device or computing system enabling the storage and retrieval of data and capable of hosting profile manager 124. Network attached storage 120 may transmit data to other computing devices, such as user device 110, that are attached to network 130. Although not shown, optionally, network attached storage 120 may include a cluster of servers executing the same software to collectively process and monitor the data storage and retrieval requests of other computing devices attached to network 130. In an example embodiment, network attached storage 120 may provide a location for shared storage of computer files (e.g. user profile files) that can be accessed by other computing devices attached to network 130, such as user device 110. In an example embodiment, network attached storage 120 may contain user profile data for users of user device 110. Furthermore, in an optional embodiment, network attached storage 120 may detect requests for access to user profile data and redirect those requests to profile manager 124. Network attached storage 120 is described in more detail with reference to FIG. 3.

File system 126 may be a software program configured to control how data is stored and retrieved on network attached storage 120. File system 126 may also manage access to the content of computer files and to the metadata about those files. Additionally, file system 126 may contain a user profile container 128. In an example embodiment, file system 126 may provide access, via a network protocol (e.g. SMB, NFS), to computer files stored on network attached storage 120. In an example embodiment, file system 126 may receive a request, from profile manager 124, to access to the profile data belonging to a user of user device 110. Although only one user profile container, namely user profile container 128, is depicted within file system 126, an example file system 126 may contain a plurality of user profile containers for individual users. Additionally, although only one user device, namely user device 110, is depicted in profile data management system 100, file system 126 may service a plurality of user devices via network 130.

User profile container 128 may be a binary large object (BLOB) within file system 126, located on network attached storage 120. User profile container 128 may be a collection of binary data stored as a single entity. In an example embodiment, user profile container 128 may aggregate the entirety of a single user's profile data, stored on network attached storage 120, in a single object. A user's profile data may comprise a collection of user profile characteristics and settings (e.g. desktop backgrounds, screen savers, pointer preferences, sound settings, application settings, etc.) that enable user device 110 to look and function in accordance with a user's defined preferences. In an example embodiment, every user of user device 110 will have a user specific container, such as user profile container 128, which may contain all user specific profile information. In an example embodiment, user profile container 128 may be accessed and modified by profile manager 124. Furthermore, in an example embodiment, user profile container 128 may be one of plurality of user profile containers within file system 126.

Protocol server 125 may be a software application or configuration in a software application capable of acting upon the data requests received from protocol client 114. Protocol server 125 may also identify requests for access to profile data belonging to a specified user and re-route those user profile data access requests through profile manager 124. Protocol server 125 may receive profile data belonging to a specified user from profile manager 124. Furthermore, protocol server 125 may also transmit and receive profile data belonging to a specified user, to and from protocol client 114. In an example embodiment, protocol server 125 receives a login token from protocol client 114 and transmits the received login token to profile manager 124 which may facilitate access to profile data belonging to a specified user. In an example embodiment, protocol server 125 may receive profile data belonging to a specified user from profile manager 124 for transmission to protocol client 114.

Profile manager 124 may be a software application or configuration in a software application capable of facilitating access to user specific profile data consolidated within a corresponding user profile container 128, located in file system 126. Profile manager 124 may also be responsible for the creation and management (e.g. backup, data protection, metadata enhancements) of user profile containers within file system 126. In creating an individual user profile container (e.g. user profile container 128), profile manager 124 may scan the metadata of files within file system126 to identify profile data belonging to a specified user. Profile manager 124 may then aggregate all identified profile information belonging to the specified user within a single data object (i.e. a BLOB). In an example embodiment, profile manager 124 may receive, from protocol server 125, a request to read or write profile information belonging to a specified user of user device 110. Profile manager 124 may receive a login token as part of the request from protocol server 125. Profile manager 124 may then access the corresponding user profile container 128, within file system 126, containing the user's profile information and execute the requested read or write action. In an example embodiment, profile manager 124 may also send profile data belonging to a specified user to protocol server 125 for transmission to protocol client 114. The operations and functions of profile manager 124 are described in further detail below with regard to FIG. 2.

Figure 2:
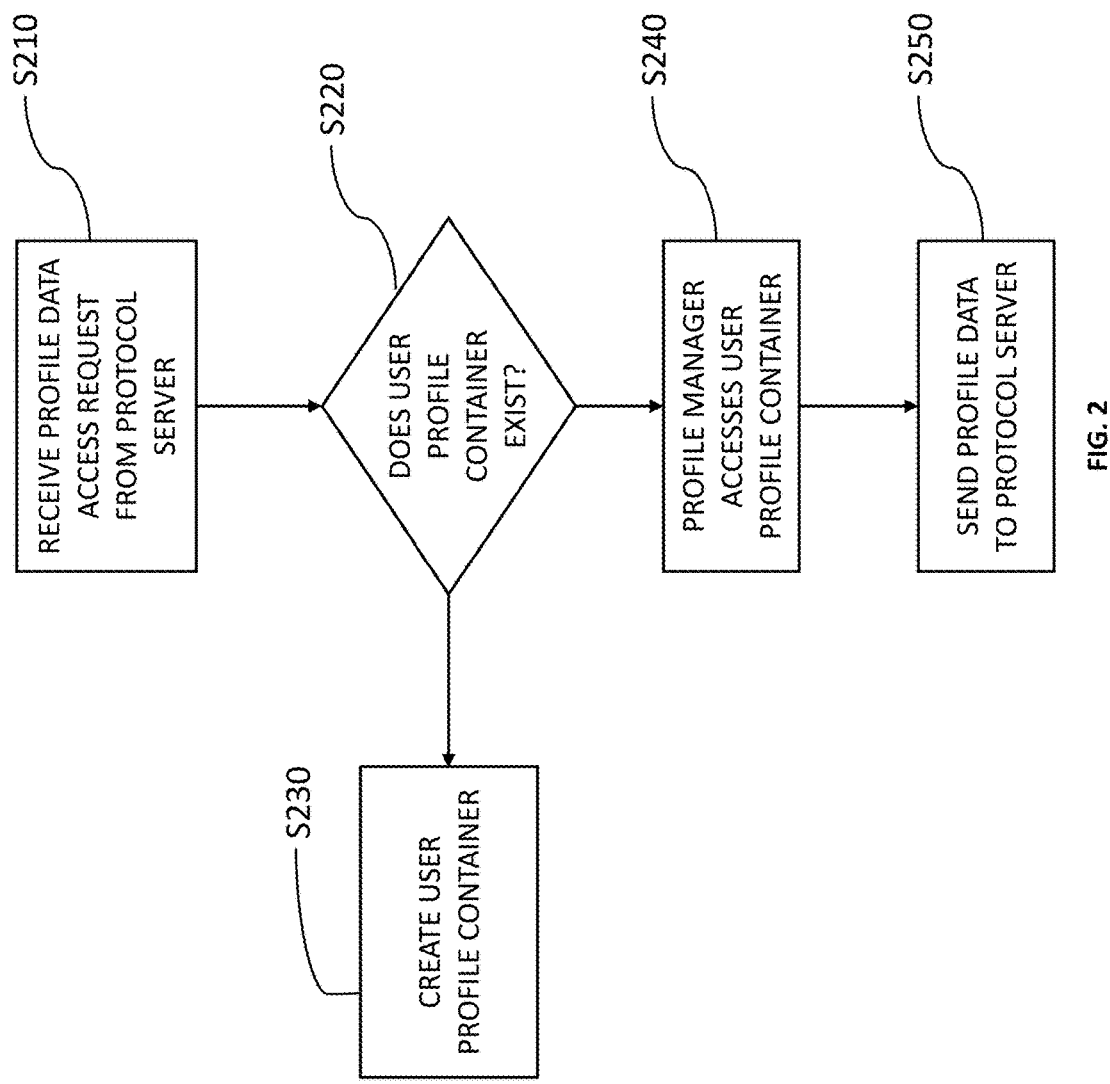
FIG. 2 is a flowchart illustrating the operations of the profile manager of FIG. 1, in accordance with an embodiment of the invention.

FIG. 2 shows a flowchart illustrating the write operation of profile manager 124 in accordance with an embodiment of the invention. Referring to step S210, profile manager 124 may receive, from protocol server 125, a request to access the user profile data for a user of user device 110. Protocol server 125 may identify requests for access to user profile files by scanning the metadata associated with each file associated with a data request and re-route any attempted access to user profile files through profile manager 124. The profile data access request received by profile manager 124 may contain information, such as a username and a password, which was entered into user interface program 112 and transmitted to protocol server 125 via protocol client 114, across network 130. Additionally, the received request may also contain instructions to either read or write profile data for the user associated with the received login token. In an example embodiment, profile manager 124 may receive an access request to read profile information belonging to a specified user of user device 110 and stored on network attached storage 120. The profile read access request received by profile manager 124 may be the result of protocol server 125 receiving a login token from a user logging into user device 110 through user interface program 112, and re-directing that input to profile manager 124. Profile manager 124 may then facilitate access to the profile information associated with the login token. In another example embodiment, profile manager 124 may receive an access request to update profile information belonging to a specified user of user device 110 and stored on network attached storage 120. The profile update access request may be the result of protocol server 125 transmitting the login token for a user logging off user device 110, through user interface program 112, to profile manager 124. Profile manager 124 may then facilitate access to the profile information associated with the transmitted login token.

Referring to step S220, profile manager 124 determines if a user profile container exists for the user associated with the login token received in step S210. If a user profile container for the specified user exists, profile manager 124 proceeds to step S240. If a user profile container for the specified user does not exist, profile manager 124 proceeds to step S230.

Referring to step S230, profile manager 124 may scan file metadata within file system 126, located on network attached storage 120, to identify the profile files associated with the login token received in step S210. Profile manager 124 may then encapsulate all identified user profile files, for the user associated with the login token received in step S210, into a single user profile container within file system 126 located on network attached storage 120. For each user, all profile information will be contained in a single user profile container (e.g. user profile container 128). Organizing user profile files into individual user profile containers will prevent duplicate user profile data and improve the overall performance and manageability of network attached storage 120 by allowing for a single location from which to access the entirety of a user's profile data.

Referring to step S240, profile manager 124 may access the user profile container (e.g. user profile container 128), located in file system 126, for the user associated with the login token received in step S210. Profile manager 124 may also execute the instructions contained in the user profile data access request received in step S210. In an example embodiment, profile manager 124 may receive an instruction to read profile information belonging to a specified user of user device 110 and stored on network attached storage 120. The profile read instruction may be the result of protocol server 125 receiving a login token, via protocol client 114, from a user logging into user device 110 through user interface program 112, and re-directing that input to profile manager 124. Profile manager 124 may then read profile information from the user profile container (e.g. user profile container 128) associated with the received login token. In another example embodiment, profile manager 124 may receive an instruction to update profile information belonging to a specified user of user device 110 and stored on network attached storage 120. The profile update (i.e. write) instruction may be the result of protocol server 125 transmitting the login token for a user logging off user device 110, through user interface program 112, after making changes to profile information. Profile manager 124 may then update the profile information within the user profile container (e.g. user profile container 128) associated with the login token received from protocol server 125.

Referring to step S250, profile manager 124 may send the user profile data resulting from the instructions executed in step S240 to protocol server 125. In an example embodiment, profile manager 124 may send profile information (e.g. desktop backgrounds, screen savers, pointer preferences, sound settings, application settings, etc.), belonging to a specified user, to protocol server 125 upon executing a profile read instruction generated in response to the user logging into user device 110.

Figure 3:
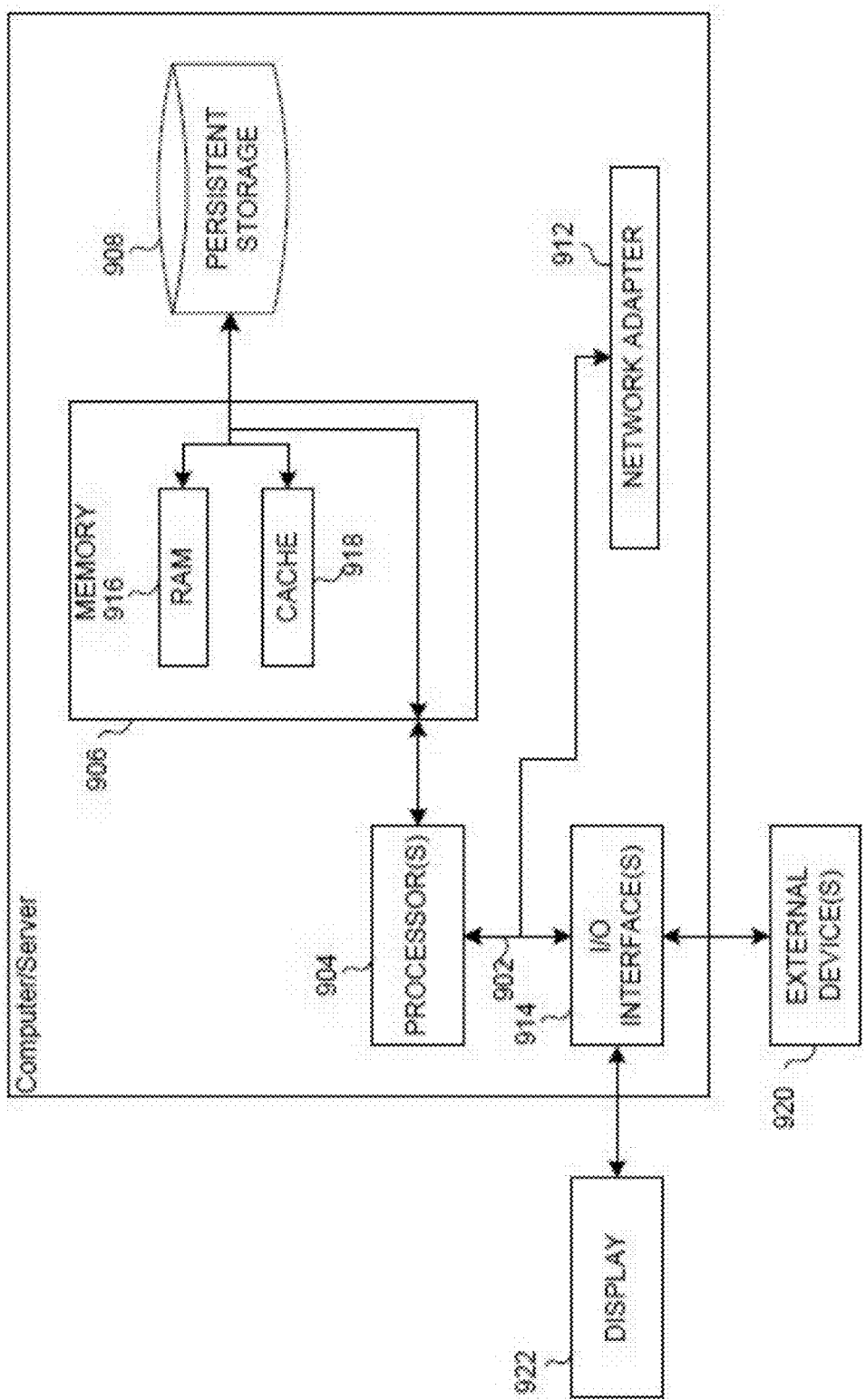
FIG. 3 is a block diagram depicting the hardware components of the profile data management system of FIG. 1, in accordance with an embodiment of the invention.

FIG. 3 depicts a block diagram of components of user device 110 and network attached storage 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

User device 110 and network attached storage 120 include communications fabric 902, which provides communications between computer processor(s) 904, memory 906, persistent storage 908, network adapter 912, and input/output (I/0) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs profile manager 124, protocol server 125, file system 126, and user profile container 128 in network attached storage 120; and user interface program 112 and protocol client 114 in user device 110 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs profile manager 124, protocol server 125, file system 126, and user profile container 128 in network attached storage 120; and user interface program 112 and protocol client 114 in user device 110 may be downloaded to persistent storage 908 through network adapter 912.

I/O interface(s) 914 allows for input and output of data with other devices that may be connected to network attached storage 120 and sender user device 110. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., the programs profile manager 124, protocol server 125, file system 126, and user profile container 128 in network attached storage 120; and user interface program 112 and protocol client 114 in user device 110, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
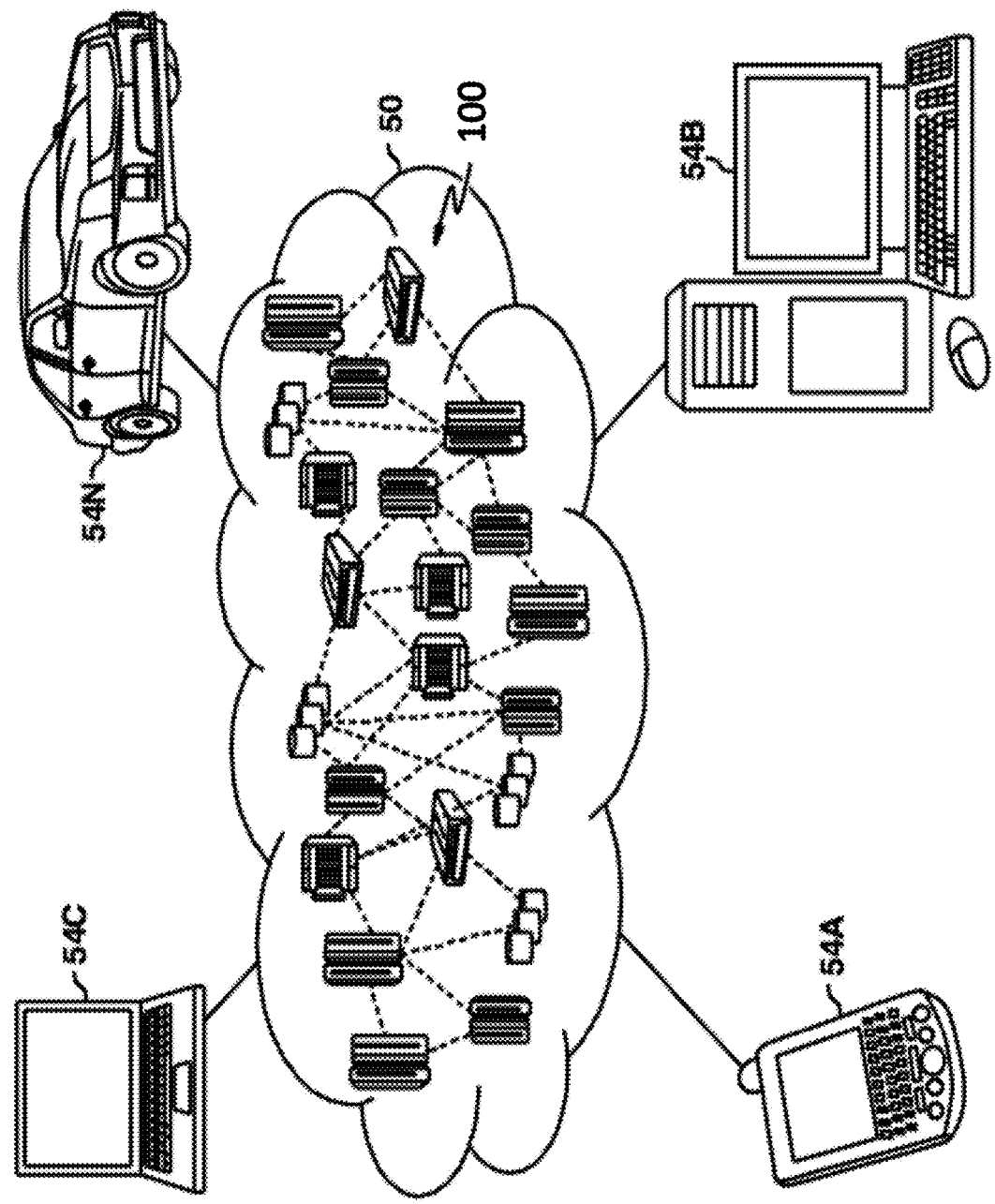
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 5:
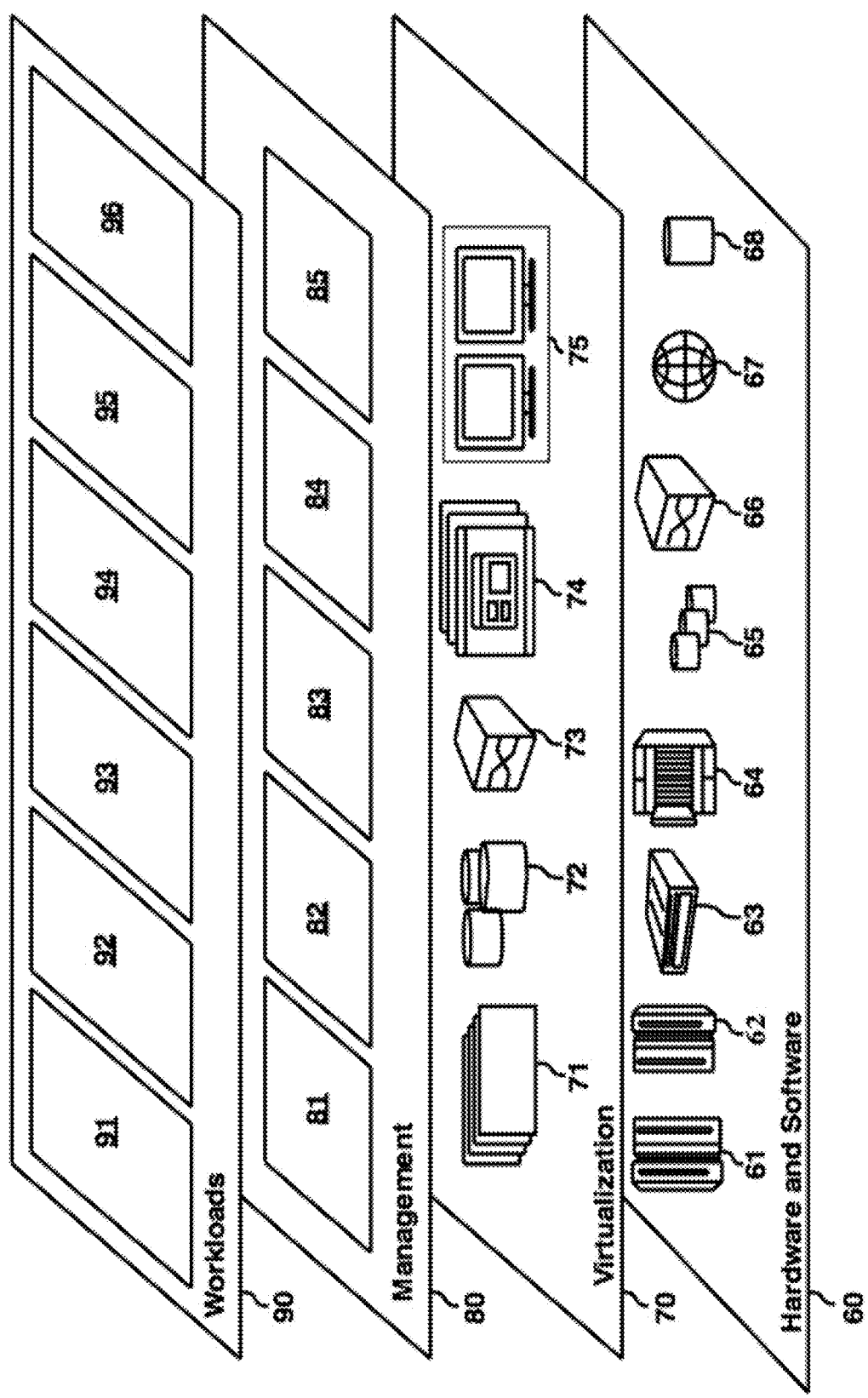
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and profile data management system 96. Profile data management system 96 may relate to the management of user profile data.

What is claimed is:

1. A computer program product for data management, the computer program product comprising:
   one or more computer-readable tangible storage devices and program instructions stored on at least one of the one or more tangible storage devices, the program instructions comprising:
      program instructions to receive a login token and instruction from a user device, wherein the login token is associated with a user of the user device, and wherein the instruction comprises a command selected from the group consisting of: reading profile data belonging to the user and writing profile data belonging to the user, and wherein the login token and the instruction is received from a file system located on a network attached storage device, and wherein the login token and the instruction is received in response to an action of the user selected from the group consisting of: logging on the user device and logging off the user device;
      based on the received login token, program instructions to determine whether a user profile container exists for the user, wherein determining whether the user profile container exists for the user comprises scanning the file system located on the network attached storage device for a profile container associated with the received login token;
      based on determining that the user profile container does not exist, program instructions to create the user profile container for the user, wherein creating the user profile container for the user comprises:
         program instructions to identify profile data belonging to the user located in a plurality of locations within a local file system on the user device, wherein identifying profile data belonging to the user comprises scanning file metadata within the local file system for a file associated with the received login token, and wherein identified profile data belonging to the user corresponds to a user profile characteristic, and wherein the local file system and the file system located on the network attached storage device utilize an application-layer network communication protocol; and wherein the application-layer network communication protocol utilized by the local file system and the file system located on the network attached storage device is the same;
         program instructions to transmit identified profile data belonging to the user within to a single binary large object, wherein the single binary large object is stored within the file system located on the network attached storage device; and program instructions to execute the received instruction, wherein executing the received instruction comprises transmitting profile data identified as belonging to the user to the file system located on the network attached storage device.

\* \* \* \* \*